April 26, 1938.  E. K. BENEDEK  2,115,296
ROTARY RADIAL PLUNGER HYDRAULIC APPARATUS
Filed May 28, 1935  3 Sheets-Sheet 1

INVENTOR.
BY ELEK K BENEDEK.
ATTORNEY.

April 26, 1938. E. K. BENEDEK 2,115,296
ROTARY RADIAL PLUNGER HYDRAULIC APPARATUS
Filed May 28, 1935 3 Sheets-Sheet 2

INVENTOR.
ELEK K BENEDEK
ATTORNEY.

April 26, 1938.   E. K. BENEDEK   2,115,296
ROTARY RADIAL PLUNGER HYDRAULIC APPARATUS
Filed May 28, 1935   3 Sheets-Sheet 3

INVENTOR
ELEK K BENEDEK
BY
ATTORNEY

Patented Apr. 26, 1938

2,115,296

UNITED STATES PATENT OFFICE 2,115,296

ROTARY RADIAL PLUNGER HYDRAULIC APPARATUS

Elek K. Benedek, Bucyrus, Ohio

Application May 28, 1935, Serial No. 23,881

5 Claims. (Cl. 103—161)

This invention relates to hydraulic pumps, motors and transmissions of the rotary radial plunger type and particularly to an improved load transmitting means between the plungers and the plunger actuating reactances thereof.

Two general types of hydraulic mechanisms have been used heretofore each of which has certain advantages over the other, but both have features which render them unsatisfactory for high speeds and for use under high hydraulic fluid pressures.

The first type employs a rotary reactance which rotates concurrently with a plunger carrying barrel about an axis eccentric to the barrel axis and at the same angular velocity, while cooperating with the plungers, slight circumferential oscillation of the reactance relative to the plungers compensating for tangential components of eccentricity of the rotary reactance and barrel. At high speeds, it becomes necessary to mount a rotary reactance anti-frictionally so as to reduce the torque required for driving the reactance and to provide efficient load transmission. At the high pressures, any anti-friction mounting of the reactance preferably should be arranged in radial alignment with the hydraulic load transmitting means of the plungers so that the hydraulic load is delivered directly and the anti-friction mounting is subjected only to compressive stresses due to load. This necessitates a large diameter anti-friction assembly. When high speeds and high pressures are combined, however, the advantages of this type of reactance are offset by the high rotative speed of the anti-friction assembly so arranged in radial alignment with the load transmitting means. In fact, the rotative speed becomes so great that an anti-friction assembly so arranged and capable of withstanding the speed without excessive frictional heating and consequent failure is difficult to provide. Likewise, excessive centrifugal and inertia forces are developed. Consequently, for high pressures and speeds combined the stationary reactance types of mechanisms are utilized with somewhat better results.

While rotary reactance pumps and motors are successful commercially up to a certain size, above such size they are impractical due to the rapid increase of their cost of manufacture. For sizes utilizing standard complete anti-friction bearings, for example, a bearing of 12" inner diameter may be obtained for commercial prices and will perform at commercial speed. However, above these sizes the bearings are guaranteed and rated only for speeds and loads which are less than those required for high speed operation comparable to the speeds of the smaller size pumps and their bearings. For higher delivery and speeds such as 200 H. P. and 900 to 1,000 R. P. M. bearings cannot be obtained at commercial prices, but only on special order and at an almost prohibitive price. The art of making these bearings is insufficiently developed with the result that the manufacturer, even while asking an almost prohibitive price therefor, is unable to specify or approve the performance of the bearing assembly for the high speed application necessary to be withstood, apparently because of lack of experience and data as to the working of such bearings. The manufacturers construct the large bearings on the same principles as small size standard bearings are constructed, but the art of manufacture of smaller standard bearings, when so applied in making the larger bearings for proportionate speed and load performance results in bearings which rapidly overheat and burn out at peripheral speeds of from 5,000 to 10,000 feet per minute. The heating of bearings above standard sizes, built in accordance to the specifications of the smaller bearings, is further aggravated by the fact that larger bearings require greater radial press fit on a much heavier driving member, with the consequence of radial elastic expansion and additional tightening of the races on the anti-friction elements. It is not known exactly how much of the press fit goes into the driving member and into radial expansion of the inner bearing race, but I found in practical application that the radial clearance in larger bearings must be about ten times greater than provided in conventional design.

Another serious disadvantage in connection with larger and high speed bearings of the commercial type is the fact that failure of any one element or part of the bearing assembly causes rapid destruction of the entire assembly or so damages some portions of the race that the remainder of the very expensive assembly must be discarded. Furthermore, in event of breakage of any roller or race element the parts drop into the high speed pump structure, additionally damaging the same.

In the stationary reactance type of pump or motor this large bearing assembly is eliminated. However, the load transmitting elements between the plungers and the stationary reactance must roll efficiently about the circumference of the reactance if they are to take the place of the eliminated large anti-friction bearings of a rotary reactance structure, on a favorable competitive basis with respect to useful life and specific output of the machine. The speed of complete rotation of the transmitting elements about their own axes and bearing surfaces is becoming so great that it is difficult to maintain them in proper lubricated and free rolling condition and at the same time of sufficient load bearing capacity. Furthermore, only a very limited space can be provided in the plunger heads for accommodating the load transmitting elements if a reduced competitive overall radius of the mechanism is to be retained and the mass of the parts is to be kept sufficiently small to prevent inefficiency and damage to the parts due to excessive centrifugal and inertia forces.

It must be borne in mind that in the stationary reactance type of machines, the load transmitting means must concurrently roll and rotate at high speed, revolve with the pistons and barrel, and reciprocate at high speeds while transmitting heavy hydraulic loads. These combined factors render difficult the provision of proper bearing means between the load transmitting elements and the stationary reactance sufficient to insure that the load transmitting elements will roll and not slide on the reactance and will withstand, while rolling and rotating the extremely heavy hydraulic loads. Heretofore a satisfactory solution has not been made of this problem which requires simultaneous consideration of all the requirements of a durable and efficient machine.

A distinct advantage resides in the utilization of a stationary reactance in the structure herein described in that in event of failure of any one or part of the rolling load transmitting elements, only the part failing need be replaced and this can be done readily at a very small cost and the possibility of damage to any other part of the mechanism thereby is extremely remote.

The present invention has to do with antifriction load transmitting elements operatively connecting the plungers and stationary reactance by virtue of which, first, the reduced overall diameter of the mechanism may be retained, so as to reduce the circumferential distance over which the elements must roll for each revolution of the barrel, and, second, the rotational speed of the transmitting elements with respect to each other and to the cooperating plunger surfaces are materially reduced, regardless of the diameter of the reactance with which they are cooperated, and third, adequate load transmitting capacity and free rolling is obtained without any appreciable increase in the mass of the moving parts.

The principal object of the present invention is to provide a load transmitting means between a reactance and plunger by which free anti-friction rolling engagement between the plunger and the stationary reactance is effected.

A correlative and equally important object is to reduce the rotational speed of the parts of the load transmitting elements with respect to each other and to the associated supporting surfaces of the associated plunger.

Other objects are to accomplish these results without increasing the size and weight of the working parts and while providing adequate load transmitting capacity between the plungers and reactance.

Other objects and advantages will become apparent from the following description wherein reference is made to the drawings in which Fig. 1 is a horizontal longitudinal sectional view of a transmission mechanism embodying the principles of the present invention;

Figs. 2 and 3 are vertical cross sectional views taken on planes indicated by the lines 2—2 and 3—3 respectively of Fig. 1, part thereof being taken on lines 2a—2a and 3a—3a respectively for clearness in illustration;

Figure 1:
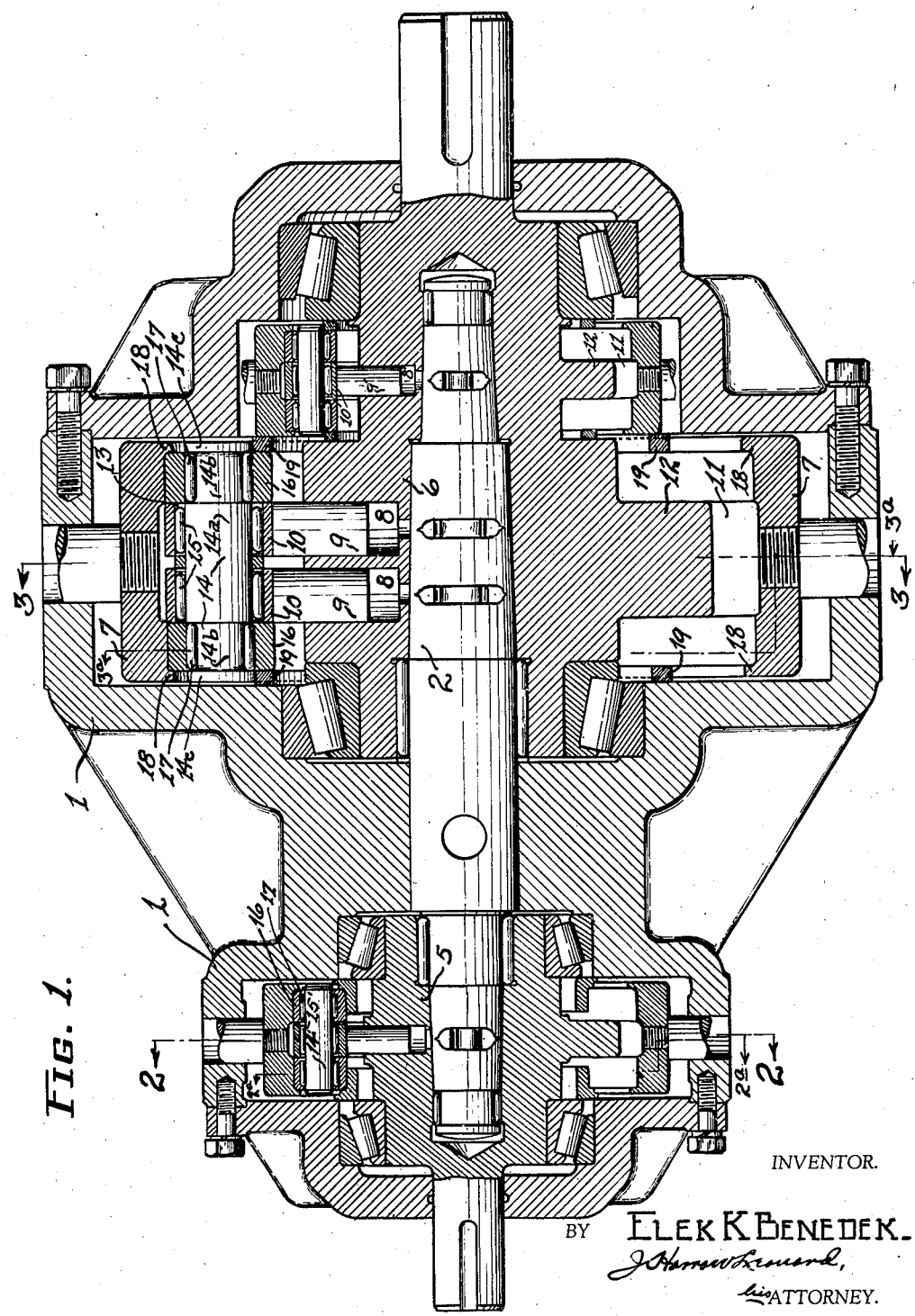

Referring to Fig. 1, the invention is shown, for illustrative purposes, as embodied in a transmission comprising a casing 1 having a valve pintle 2 on the ends of which are mounted respectively a pump barrel 5 and a multi-stage motor barrel 6, the transmission being of the multi-stage type such as more fully described and claimed in my copending application, Serial No. 22,259, filed May 18, 1935. Since load transmitting elements between the plungers and reactance are the same regardless of whether the structure is used in a pump or motor, the largest motor stage only will be described in detail, the corresponding parts of the smaller motor stage being apparent therefrom.

The barrel 6 is rotatably mounted in the casing 1 for rotation about the axis of the corresponding end of the pintle 2, which fits the axial bores of the barrel and is provided with suitable valve ports cooperable with the barrel cylinders for valving relation, as more fully described in said copending application. Within the casing 1 and surrounding the barrel 6 is a stationary reactance 7 having its axis parallel to the rotative axis of the barrel 6. The barrel is provided with a plurality of radial cylinders 8 in each of which is received a reciprocable plunger 9 having an enlarged head portion 10 at its outer end. The heads 10 of the plungers are reciprocable with the associated plungers radially of the barrel in radial guideways 11 formed in the radial flanges 12 of the barrel so as to relieve the plungers proper from torque stresses.

In the form illustrated, the stationary reactance 7 is mounted for adjustment, as described in my copending application, to different degrees of eccentricity relative to the barrel while maintained with its axis parallel to the barrel axis.

The load transmitting elements between the plungers and the reactance 7, with which the present invention is particularly concerned, will be described in connection with the dual cylinders 8 and plungers 9, which, in operative effect, constitute a single large capacity plunger and cylinder assembly but without requiring as large a diameter pintle and barrel bore for the opening to the cylinders. Each of the piston head portions 10 is provided with a transverse bore 13 extending parallel to the rotational axis of the barrel. Mounted within the bore of each plunger, or aligned bores of each pair of dual plungers, and extending parallel to the barrel axis is a load transmitting thrust pin 14, having a central portion 14a coextensive axially of the pin with the associated plunger, and contiguous reduced diameter end portions 14b with extreme outer end portions 14c of slightly larger diameter than the portions 14b. The pin is mounted within the bore 13 on capillary cageless anti-friction needle rollers 15, a spacing washer being provided between the dual plungers for retaining them in proper relation to each other and for closing the adjacent ends of the plunger head bores so as to prevent axial displacement of the rollers 15 and to form an oil retaining trough therefor. The rollers 15 are utilized as they provide free rotation of the pin about its axis within the bore 13 under extreme hydraulic loads. This results because of the free individual rolling action of each of the rollers 15, and because their small diameter and close spacing provides a large projected bearing surface between the pin and cooperating wall portions of the plunger head bore. Furthermore, their small mass, and absence of races and other accessories does not increase the weight, inertia and centrifugal force, and size.

Mounted on the protruding ends 14b of the crosspins 14 are rollers 16 which are in rolling engagement with the inner circumferential wall of the reactance 7 for transmitting load between the plungers and reactance. The reduced portions 14b of the pin are coextensive axially with the associated rollers 16, so that the shoulders formed between the reduced portions and larger diameter portions 14a and 14c define with the bores of the rollers 16 circumferential troughs for accommodating capillary cageless rollers 17 by which the rollers are mounted on the portions 14b. If desired, slight axial clearance between the ends of the rollers 17 and said shoulders may be provided. Radial shoulders 18 are provided on the reactance 7 for constraining the rollers 16 axially to proper position with proper operating clearances axially of the rollers.

Figure 2:
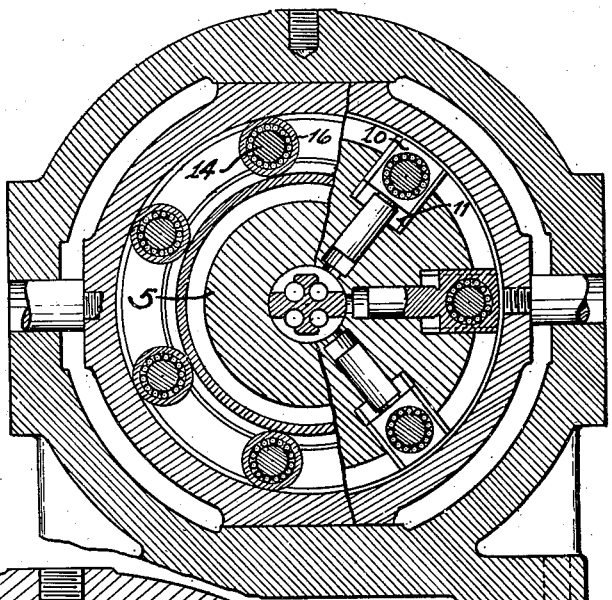
Figure 6:
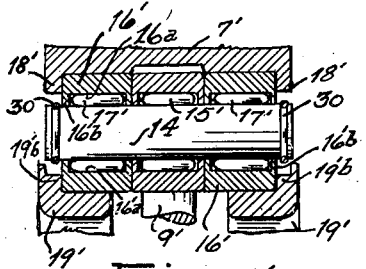
Fig. 6 is an enlarged fragmentary longitudinal sectional view of the load transmitting elements of the pump or motor of Fig. 2.
Figure 3:
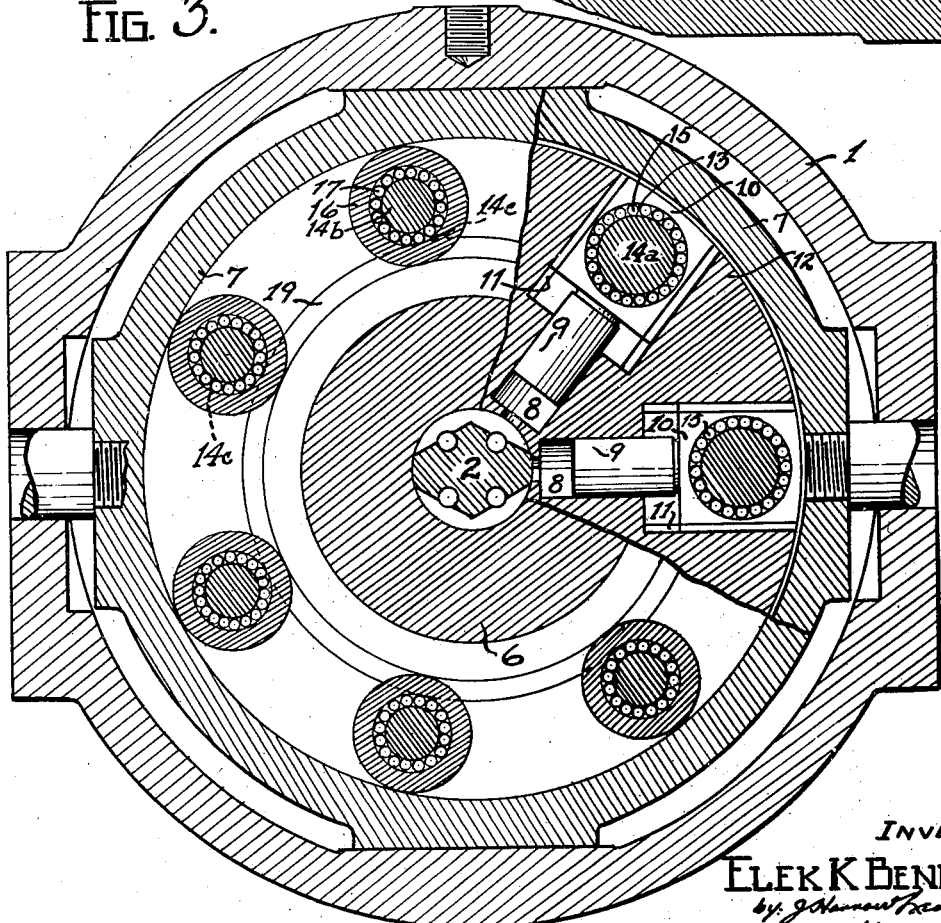

The radial side walls of the casing 1 are spaced slightly from the ends of the pin 14 so that the pin, mounted as described, is free to float axially a limited amount. In order to retain the needle rollers and plunger operating rollers and cooperating pin portion in assembled condition so that in event of breakage of the pin, these parts will not become disassembled, the needle rollers may be more positively confined between the plunger rollers and pin and a trough assured for retention of lubricant for the needle rollers by the structure illustrated in the smaller stage unit and the pump in Figs. 1, 2 and 6, in which the corresponding parts are designated by primed numerals. In this structure, a pin 14' of constant diameter is used and the bore of each roller 16' is provided with an enlarged portion intermediate its ends, as indicated at 16'a, defining end walls 16'b. The needle rollers 17' are received in this enlarged portion and constrained within fixed axial limits by the end walls 16'b. The needle rollers 15' of the plunger heads may be correspondingly retained. The end walls 16'b may be formed by press fitted washers if desired. Thus not only are the needle rollers retained but circumferential lubricant retaining troughs are provided. For retaining the rollers 16' on the pins, snap spring washers 30 are fitted into circumferential recesses in the ends of the pins 14'. The floating rings 19' in this modified structure may engage the ends of the pin, as do the rings 19 hereinafter described, but preferably engage the rollers 16' and are provided with radial shoulders 19'b at their outer ends which engage the end margins of the rollers 16' and assist in retaining the rollers 16' in position. Such shoulders 19'b also reinforce and strengthen the rings 19', thus enabling them to withstand radial load and wear more effectively.

In order to insure retention of the rollers 16 or 16' in proper operating engagement with the reactance and positive actuation thereof on the suction or low pressure strokes in case the centrifugal force is inadequate for this purpose for any reason, reactance rings 19 are provided. Heretofore, such rings as have been provided have engaged the rollers of the plungers so that rolling engagement of the rollers with the rings as well as with the reactance was provided. This, however, results in increased rolling friction. All of the plunger rollers do not roll at the same speed in mechanisms of this character, as the radius of revolution of any roller is constantly changing and is different for each roller at any given instant. Consequently, a ring so mounted imposes sliding friction on the rollers. In the present structure, however, the rings 19 or 19' are free to float circumferentially, and sufficient radial clearance is provided for radial floating movement with the rollers and limited radial floating movement relative to the rollers. The radial clearance between the ring 19 and rollers 16 is such that the ring 19 may be substantially free from rotation except rotation occasioned by intermittent light contact with the rollers 16 or when the centrifugal force is insufficient to actuate the pistons outwardly. Therefore, the rollers 16 are in rolling engagement substantially with only the outer reactance 7, and so are free from radial binding stresses and subjected to less rolling frictional engagement.

In order to reduce any relative rotational movement of the rings 19, however, and to utilize them also for retaining the rollers 16 properly positioned axially, the rings 19 are positioned to engage the circumferences of the end portions 14c of the pins 14, the circumference of which is much less than the circumference of the rollers 16. Even if the rings 19 were tight fitted, therefore, their rotational speed would be far less than if they engaged the circumference of the rollers. Since the pins 14 do not rotate with as great angular velocity as the rollers in the present structure, the rotation of the ring 19 is negligible and continuous operation at high speeds may be obtained without any appreciable heating effects being caused thereby. It should be noted that the rings 19 are retained in axial position by the radial side walls of the casing 1, the rollers 16, and, in some cases, by the reactance of adjacent stage units. Consequently, in case any roller 16 or roller and associated pin portion is broken loose, both the rollers 16, and the roller, pin and needle rollers 17 in assembled condition are constrained by the ring 19, the radial walls of the casing 1, and radial flange 12 from becoming jammed against other parts or broken and from becoming misplaced and wrecking other parts of the structure.

With a structure such as provided, it is apparent that free rolling engagement of the rollers 16 with the reactance 7 is effected. Due to the larger diameter of the rollers relative to the pins 14, the rotative speed of the rollers about their own axes is reduced for a reactance of given diameter over the speed that would be present were the pin portions 14b directly engaged by the reactance. However, at high speeds, this reduction is insufficient and therefore not only is the pin 14 anti-frictionally mounted within the bore 13 for free rotation about its own axis but the rollers 16 are anti-frictionally mounted on the pin on capillary cageless needle rollers 17, which correspond in operation and arrangement to the capillary rollers 15 above described.

This results in a very marked improvement, first but of lesser importance, is the fact that frictional resistance to rotation of the rollers about their own axes is reduced. Far more important, however, is the fact that the pin does not have to rotate in the bore of the plunger head once for each rotation of the rollers 16 about their own axes nor do the rollers 16 rotate relative to the pin once for each revolution about their own axes. Instead, the pin and rollers may rotate concurrently about their common axis so that the total rotation of the pin and rollers 16 about the common axis is divided between the two. For example, if the circumferential wall of the reactance 7 is 100 units in length and the circumference of each roller 16 is one unit in length, each roller has to rotate 100 times about its own axis for each revolution around the circumference of the reactance 7. If the pin were stationary the relative rotation between each roller 16 and the pin would be 100 rotations for each revolution of the barrel. The same would be true as to the pin and plunger head bore were the rollers 16 fixed relative to the pin. However, the pin may rotate about its own axis relative to both the plunger head and rollers 16. Therefore, it may rotate fifty revolutions for each revolution about the barrel axis and the rollers may rotate fifty revolutions. Thus the relative rotation between the pin and plunger head is reduced to one half and correspondingly the rotation between each roller and the pin is reduced one half. Thus the speed of rotation of the barrel can be doubled without any increase in the speed of rotation of the pins or rollers relative to their supports over the speeds that are necessary in present types of pumps and motors.

By varying the size of the needle rollers and rollers 16, the length of needle rollers between the rollers 16 and pin relative to those between the pin and plunger head bore, a different proration of the total rotation among the pin 14, the rollers 16 and the plunger head can be effected so that the desired differential or relative rotation between any two may be obtained. These variations in proportion of the length and size of the rollers mounting the pin in the plunger head relative to the rollers mounting the rollers 16 is, of course, dependent upon the particular speed and pressure to be withstood as well as on the diameter of the particular rollers 16 to be used in connection therewith. In general, however, the needle rollers for the crosspin need only be sufficient to withstand the load to be imposed thereon and of approximately the same length as the rollers provided in the rollers 16.

Figure 4:
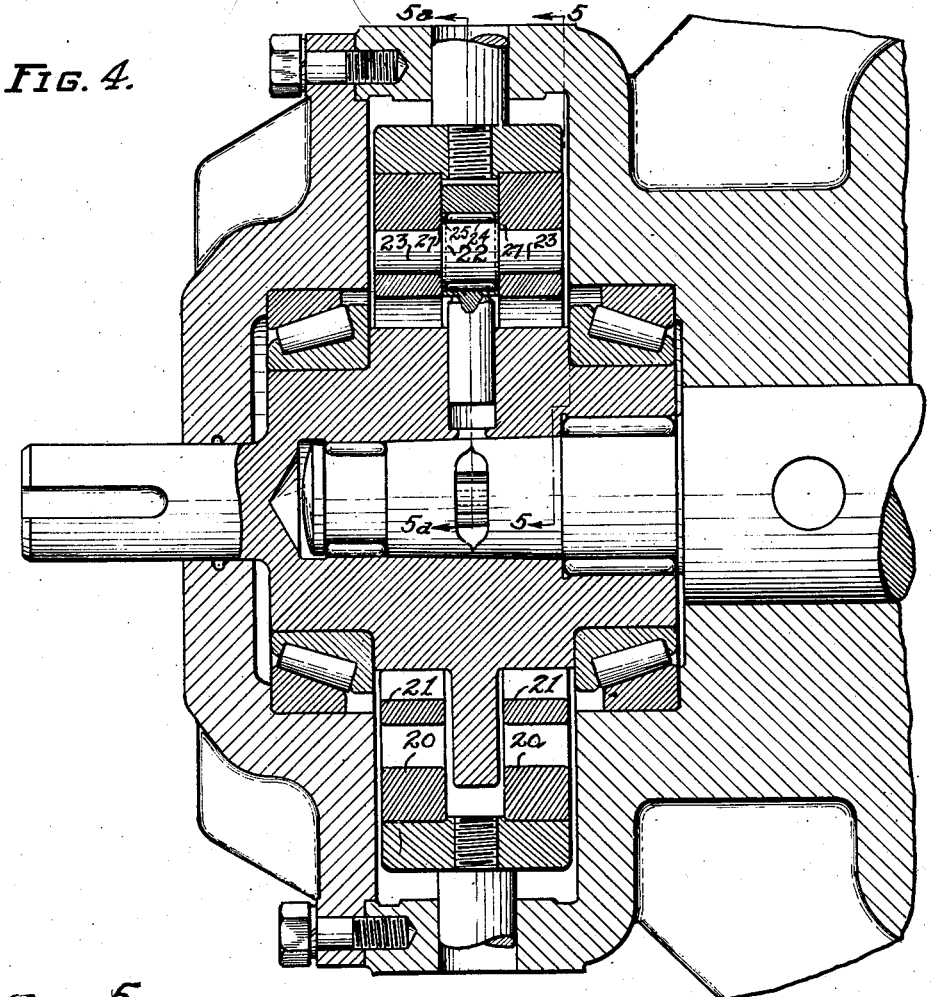
Fig. 4 is a vertical sectional view of a pump or motor of a hydraulic transmission, illustrating a modified coupling between the plungers and the reactance.
Figure 5:
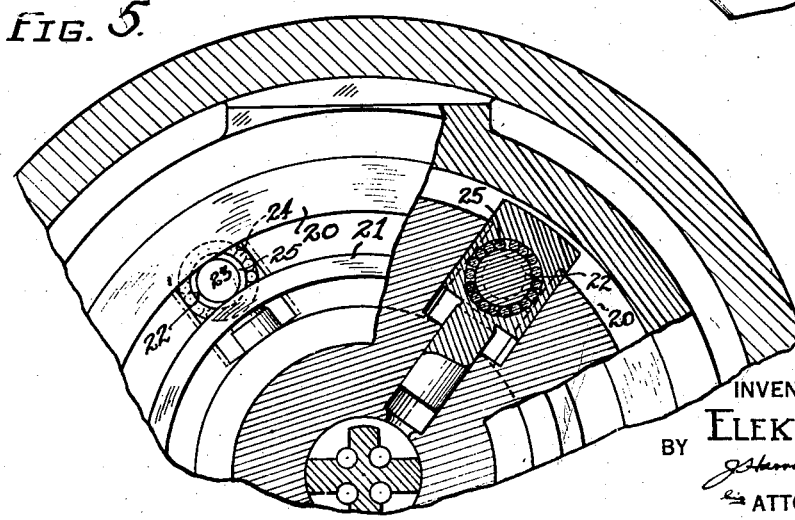
Fig. 5 is a vertical sectional view of the pump illustrated in Fig. 4 and is taken partly on line 5—5 and partly on line 5a—5a of Fig. 4.

Referring next to Figs. 4 and 5, a compromise is provided for use in smaller diameter or lower speed pumps and motors. In order to further decrease the diameter of the reactance, the rollers, such as the rollers in the pump in Fig. 1, are eliminated. This permits further reduction in diameter of the reactance 20 and floating rings 21. This is offset partially by the fact that the smaller diameter portion of the crosspin engages the reactance directly and must roll therealong and, since its diameter is also reduced, it must rotate more times for each rotation of the barrel than would a large roller. It is absolutely necessary, however, that rolling be assured. Accordingly, the crosspin is comprised of a central hub portion 22 and end portions 23 which are of smaller diameter than the hub section. The hub portion is mounted in anti-friction capillary cageless needle rollers 24, corresponding to the bearings 15 above described, in suitable bores in the plunger heads, the bore extending parallel to the axis of the barrel. The needle rollers, in turn, are retained in the plungers by suitable rings 25, press fitted into the plunger bores so as to form therewith a substantially unitary structure and a trough for retaining lubricant on the rollers. The end portions 23 of the pins directly engage the reactance 20 and floating rings 21 for rolling relatively thereon. Thus the frictional resistance to rotation of the hub portion 22 is less than the rolling frictional resistance between the end portions 23 and rings 20 even with the reduced diameter of the end portions 23. Consequently, rolling of the pins on the rings is assured. The hub portion 22 and the end portions 23 are joined by a curved portion and the edges of the rings 20 are rounded correspondingly, as indicated at 27, so as to provide a rolling shoulder engagement for constraining the pins to fixed axial position within the plunger bores while providing proper rolling engagement. By this reduction of the size of the pins at the ends, a reduction in the diameter of the rings 20, and in the diameter and size of all the parts of the pump may be effected and centrifugal and inertia forces reduced. By the use of the capillary cageless needle bearings, the danger of the pin binding in the plunger is entirely eliminated and an adequate load bearing surface is provided without appreciable changes in size and weight of the assemblies. The rings 21 are likewise free floating in the same manner as the rings 19 heretofore described, so that free rotation of the pin ends is permitted while the rings 21 may be substantially free from rotation.

Such arrangements as above described may be used in connection with rotary reactances in extreme cases, though the problems to be solved in rotary reactances generally do not require such transmitting elements.

It should be noted that in the claims herein, reference is made to "low pressure" strokes and such term is used generically to mean the suction stroke of the mechanisms when operating as a pump or the exhaust stroke when operating as a motor. The parts of the present structure not relating to the load transmision are reserved for inclusion in my copending application, Serial No. 22,259, filed May 18, 1935.

Having thus described my invention, I claim:

1. In a rotary radial plunger pump or motor including a rotatable barrel having a plurality of radial cylinders, valve means in valving cooperation with the cylinders, plungers in said cylinders reciprocable radially thereof, a reactance surrounding the barrel for transmitting hydraulic load between the plungers and reactance during rotation of the barrel, each plunger having a bore extending parallel to the barrel axis, a load transmitting pin rotatably mounted in said bore and having end portions extending beyond the lateral limits of the associated plungers, rollers mounted on the extending portions of the pin for rotation about the axis thereof and relative to the pin, the said end portions extending parallel to the pin axis beyond the rollers, and reactance means in relatively rolling engagement with said last mentioned end portions of the pins for actuating the plungers on low pressure strokes and for retaining the rollers in operating position on the first reactance.

2. In a rotary radial plunger pump or motor including a rotatable barrel having a plurality of radial cylinders, valve means in valving cooperation with the cylinders, plungers in said cylinders reciprocable radially thereof, a reactance surrounding the barrel for cooperation with the plungers in one direction of movement of the plungers, each plunger having a bore extending parallel to the barrel axis, a pin rotatably mounted at its central portion in said bore for rotation about the pin axis, said pin extending axially beyond the lateral limits of the plunger and having reduced diameter portions between said central plunger engaging portion and end portions, whereby reduced diameter circumferential races are formed on the pin, rollers mounted on said reduced races of said pins and coextensive axially therewith, said rollers being in rolling engagement with said reactance, anti-friction cageless rollers interposed between said rollers and reduced races of the pin and extending parallel to the pin axis and being constrained from axial displacement by said end portions of the pin and said central portion, said end portions being positioned axially outwardly beyond the rollers, and reactance means in relatively rolling engagement with the end portions of the pin and in cooperation therewith for movement of the plungers in the opposite direction.

3. In a rotary radial plunger pump or motor including a rotatable barrel having a plurality of radial cylinders, valve means in valving cooperation with the cylinders, plungers in said cylinders reciprocable radially thereof, a reactance surrounding the barrel for cooperation with the plungers in one direction of movement of the plungers, each plunger having a bore extending parallel to the barrel axis, a pin rotatably mounted at its central portion in said bore for rotation about the pin axis, said pin extending axially beyond the lateral limits of the plunger and having reduced diameter portions between said central plunger engaging portion and end portions, whereby reduced diameter circumferential races are formed on the pin, rollers mounted on said reduced races of said pins and coextensive axially therewith, said rollers being in rolling engagement with said reactance, means on the reactance constraining said rollers to substantially fixed positions axially of the associated pin, anti-friction cageless rollers interposed between said rollers and reduced races of the pin and extending parallel to the pin axis, and being constrained from axial displacement by said end portions of the pin and said central portion, said end portions being positioned axially outwardly beyond the rollers, and reactance means in relatively rolling engagement with the end portions of the pin and in cooperation therewith for movement of the plungers in the opposite direction.

4. In a rotary radial plunger pump or motor including a rotatable barrel having a plurality of radial cylinders, valve means in valving cooperation with the cylinders, plungers in said cylinders reciprocable radially thereof, a reactance surrounding the barrel for cooperation with the plungers in one direction of movement of the plungers, each plunger having a bore extending parallel to the barrel axis, a pin rotatably mounted at its central portion in said bore for rotation about the pin axis, said pin extending axially beyond the lateral limits of the plunger and having reduced diameter portions between said central portion and end portions, whereby reduced diameter circumferential races are formed on the pin, rollers mounted on said reduced races of said pins and coextensive axially therewith, said rollers being in rolling engagement with said reactance, anti-friction cageless rollers interposed between said rollers and reduced races of the pin and extending parallel to the pin axis, and being constrained from axial displacement by said end portions of the pin and said central portion, said end portions being positioned axially outwardly beyond the rollers, free radially and circumferentially floating rings in rolling engagement with the end portions of the pin and in cooperation therewith for movement of the plungers in the opposite direction.

5. In a radial rotary plunger pump or motor including a rotatable barrel having a plurality of radial cylinders, valve means in valving cooperation with the cylinders, plungers in said cylinders, and a roller engaging reactance for the plungers surrounding the barrel, each plunger having a bore extending parallel to the barrel axis, a load transmitting pin rotatably mounted in said bore and having end portions extending beyond the lateral limits of the associated plunger, rollers mounted on the extending portions of the pin for rotation about the axis thereof and relative thereto, said rollers being in rolling engagement with said reactance for transmitting load between the associated plunger and reactance, whereby the total relation of each roller may be proportioned by relative rotation of each roller and pin and each pin and plunger, and a pin engaging reactance means in rolling engagement with the pins for moving the plungers on their low pressure stroke.

ELEK K. BENEDEK.